No. 741,402. PATENTED OCT. 13, 1903.
W. E. HOLDERMAN.
LEACHING TANK.
APPLICATION FILED MAR. 23, 1903.
NO MODEL.
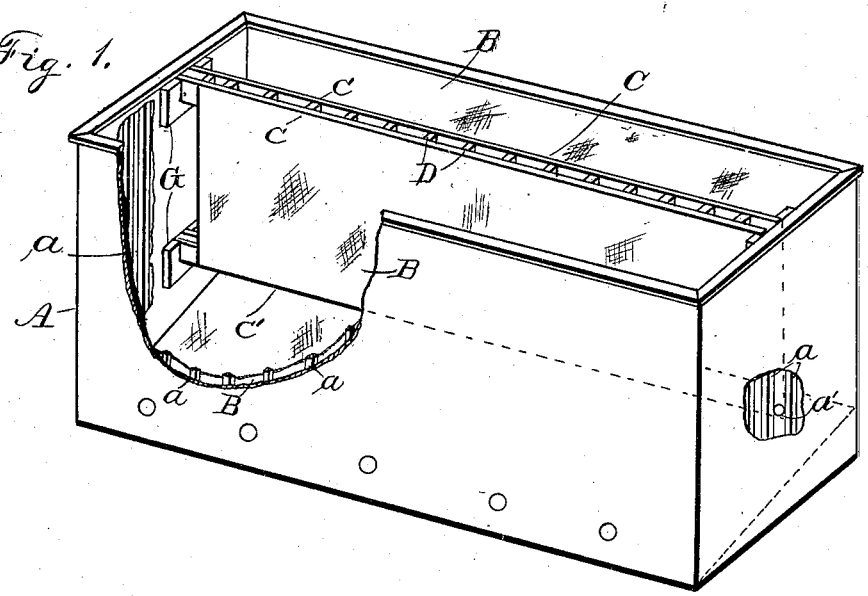
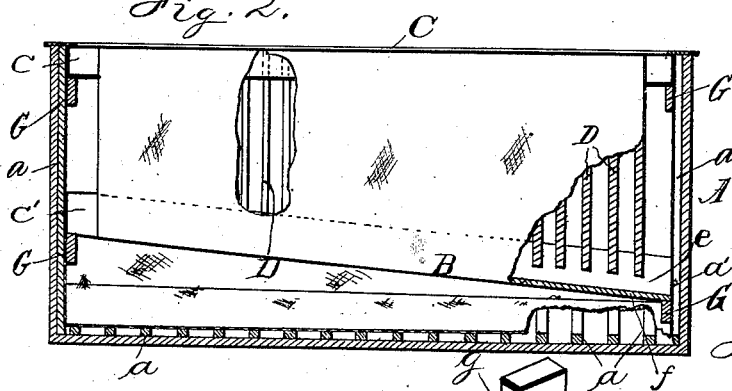
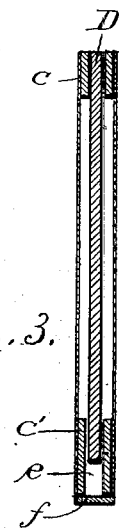
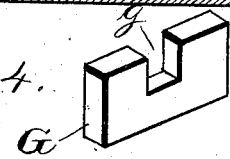
Witnesses
Inventor
William E. Holderman.
By Chas. D. Swett.
Attorney No. 741,402. Patented October 13, 1903.

UNITED STATES PATENT OFFICE.

WILLIAM E. HOLDERMAN, OF MARYSVALE, UTAH.

LEACHING-TANK.

SPECIFICATION forming part of Letters Patent No. 741,402, dated October 13, 1903.

Application filed March 23, 1903. Serial No. 149,188. (No model.)

*To all whom it may concern:*

Be it known that I, WILLIAM E. HOLDERMAN, a citizen of the United States, residing at Marysvale, in the county of Piute and State of Utah, have invented certain new and useful Improvements in Leaching - Tanks, of which the following is a specification.

This invention is an improvement on my device for treating slimes of mineral-bearing quartz for which on November 15, 1902, I applied for Letters Patent. That application has been allowed.

The device herein described can be used not only in connection with my invention above mentioned, but equally well with all leaching or filtering tanks of that general class.

It is of course well known that the greater the filtering-surface exposed to contact with the slimes and wash the more rapidly will the operation of filtering proceed.

The object of the present invention is to supply to filtering - tanks generally of the character mentioned one or more additional filtering-surfaces, whereby the filtering capacity of the filter is increased or multiplied many times at a comparatively trifling expense and which is readily inserted in or removed from the tank at any time.

The accompanying drawings illustrate the invention, in which—

Figure 1 is a perspective view of a filtering-tank, partly in section, with my improvement included therein. Fig. 2 is a side elevation of the invention with parts broken away and partly in section. Fig. 3 is an enlarged end elevation of the partition in cross-section; and Fig. 4, an enlarged detail of the supports for the partition, which are secured to the sides of the tank.

The various features of the device are referred to by letters, similar letters denoting corresponding parts in the several views.

The letter A indicates an oblong angular filtering-tank having vertical slats $a$ $a$ arranged at short intervals about its interior side and upon its inclined floor. B is the filtering fabric covering these slats.

C is the filtering device or partition, which is primarily the subject of this application. This partition C extends across the tank from end to end and is formed of double rails $c$ $c$ at its top and double rails $c'$ $c'$ at its bottom. Between these rails are secured the upper and lower ends of spaced slats D D. These slats D D do not extend to the lower edges of the rails $c'$ $c'$; but a space is left beneath the slats, which is inclosed underneath by a strip $f$, and so becomes a channel or trough $e$. The partition C should be a little deeper at one end, so as to give an incline downward to the trough $e$. The partition is covered with a filtering fabric similar to that on the sides of the tank itself. The lower end of the trough $e$ is left open, and an orifice $a'$ through the filtering fabric on the tank is made to receive into one of the spaces between the tank-slats $a$ $a$ the filtrate from the trough $e$, which is then carried off with the filtrate from the sides of the tank. This partition C may be made, if desired, to extend more nearly or quite to the bottom of the tank; but I prefer to have it reach about two-fifths of the distance from the top to the bottom of the tank.

G G are blocks or supports for the partitions secured on the interior sides of the tank. They each have a recess $g$ to form a seat for the rails $c$ $c'$.

The operation of this device is obvious. The metalliferous liquid in the tank is strained through the filtering fabric on the partition and runs out through the trough $e$, and it is equally evident that the filtering capacity of the tank is increased in proportion to the number of these partitions employed.

Having now described the invention, what I claim is—

1. In an angular filtering-tank a filtering-partition extending from end to end across said tank, and a trough in its lower edge for the filtrate.

2. In a filtering-tank having vertical slats covered with a filtering fabric, a filtering-partition extended across said tank, a trough in its bottom for the filtrate, and an orifice through the filtering fabric of said tank, into which the filtrate from said trough is discharged.

3. In a filtering-tank having vertical slats covered with a filtering fabric, a filtering-partition across said tank composed of rails $c$, $c$, at its top, rails $c'$, $c'$, at its bottom, vertical spaced slats whose ends are held between said rails, a filtering fabric covering said spaced slats and a trough at the lower edge of said partition for the purpose specified.

4. In a filtering-tank, a filtering-partition extending across said tank, supports attached to the inner sides of said tank and recesses in said supports to receive and hold said partition as herein described.

In testimony whereof I have signed my name to this specification in presence of two witnesses.

WILLIAM E. HOLDERMAN.

Witnesses:
SADIE E. PRICE,
DUNCAN J. FREW.